United States Patent [19]
Kitagawa et al.

[11] Patent Number: 5,910,331
[45] Date of Patent: Jun. 8, 1999

[54] METHOD OF FREEZE-PRESERVING VEGETABLES

[76] Inventors: Naoki Kitagawa, 14, Nishi 18-Chome, 7-jou, Iwamizawa-shi, Hokkaidou068; Ryoji Nakagawa, 9-6, 5-chome, Kitagou 2-jou, Shiroishi-ku, Sapporo-shi, Hokkaidou003, both of Japan

[21] Appl. No.: 08/669,328
[22] PCT Filed: Nov. 10, 1995
[86] PCT No.: PCT/JP95/02294
    § 371 Date: Jul. 3, 1996
    § 102(e) Date: Jul. 3, 1996
[87] PCT Pub. No.: WO96/14754
    PCT Pub. Date: May 23, 1996

[30] Foreign Application Priority Data

Nov. 11, 1994 [JP] Japan ................................ 6-301605

[51] Int. Cl.[6] .................................................. A23B 7/00
[52] U.S. Cl. .................................. 426/327; 426/524
[58] Field of Search .......................... 426/327, 321, 426/524, 639

[56] References Cited

FOREIGN PATENT DOCUMENTS

| | | | |
|---|---|---|---|
| 56-124339 | 9/1981 | Japan | 426/327 |
| 60-16541 | 1/1985 | Japan | 426/327 |
| 4-20241 | 1/1992 | Japan | 426/327 |

OTHER PUBLICATIONS

Desrosier et al, *The Technology of Food Preservation* published by AVI Publishing Co., Inc., Fourth dition, 1982 (pp. 340–344).

*Primary Examiner*—George Yeung
*Attorney, Agent, or Firm*—Goodman & Teitelbaum, Esqs.

[57] ABSTRACT

The present invention provides a method of quickly freezing vegetables, whose cells are broken and commercial value is lost when processed by a conventional freeze-preservation method, and stocking them in a freezing environment. The method according to the present invention comprises the first step of adding at least one selected from a group consisting of monosaccharide, disaccharide, oligosaccharide and sugar alcohol and polysaccharide, with or without salts, to vegetables to pickling them for several hours, the second step of quickly freezing the vegetables processed in the first step and the third step of storing the quickly frozen vegetables in a freezing environment. Polysaccharides surround cells of vegetables to remove water content of cells and protect them and monosaccharide, disaccharide, oligosaccharide and sugar alcohol and/or salts permeates into cells and is replaced with water content to prevent growth of water crystal.

2 Claims, No Drawings

METHOD OF FREEZE-PRESERVING VEGETABLES

TECHNICAL FIELD

The present invention relates to a freeze-preservation method for preserving vegetables such as cucumbers eggplant, white rape, leaf mustard, radish, etch, which have cells which are easily broken when processed by a conventional freeze-preservation method and lose the commercial value, and, particularly, to a freeze-preservation method for freezing and preserving vegetables after processed in a special manner.

BACKGROUND ART

Vegetables such as cucumber which are commercially available as materials for light pickles are shipped after mixed with 3% to 5% salt and pickled with seasoning for several hours, and an amount of shipment thereof is increasing year and year as fresh fibrous food having good resistance to the teeth and clear green tint. On the other hand, as material for green salad, such vegetables are shipped after and sterilized Therefore, it can be said that such commercially available material vegetables for light pickles and green salad are accepted by consumers to some extent. However, since a preservable time of them is usually about one week after shipment, the preservability thereof is poor and so manufacturers must produce and ship them while estimating the marketability thereof. Therefore, it is very difficult for the manufacturers and traders to stably produce and sell them efficiently through years due to change of planting area, climate, unstable factors such as quality and cost caused by seasonal shift of planting area and heating cost for heating green houses in winter season and, so a novel method for storing fresh vegetables has been highly required.

As one of proposals, an attempt of freeze-preservation of material vegetables for such green salad and light pickles as mentioned above has been made. However, since the water content of cells of such material vegetables is crystallized when frozen, tissue thereof is damaged when defrozen, resulting in dripping of the vegetables, degradation of resistance to the teeth and rapid degradation of freshness. This can not be completely prevented by a conventional rapid nitrogen gas freezing technique or a conventional freezing method in which water content of the vegetable is removed by using salts of high concentration and then the vegetable are frozen.

An object of the present invention is to provide a method of freeze-preserving vegetables by not merely rapidly freezing them as in the conventional method but adding substances which remove water from cells of the vegetables and block crystallization of water molecules to the vegetables.

Another object of the present invention is to provide a freeze preservation method of vegetables which can restrict a growth of water crystals in cells of vegetables to prevent cell membranes, cell walls and intracell organs of vegetables from being destroyed when the vegetables are frozen and make the vegetables usable as materials for light pickles without necessity of any post processing thereof immediately after they are defrozen and usable as materials for fresh green salad by supplementing water to cells of the defrozen vegetables to restore their plasma and which can widen the shipping condition of fresh vegetables indispensable for human being to stabilize the food situation of human life.

DISCLOSURE OF INVENTION

The freeze-preservation method of vegetables according to the present invention comprises a first step of adding at least one selected from a group consisting of monosaccharide, disaccharide, oligosaccaride and sugar alcohol and polysaccharide to vegetables to pickling them for several hours, a second step of quickly freezing the vegetables processed in the first step and a third step of storing in quickly frozen vegetables in a freezing environment.

In the first step of the freeze-preservation method of vegetables according to the present invention, it is possible to further add salts.

Monosaccharide usable in the present invention includes grape sugar, levulose, xylose, galactose, etc. Disaccharide includes trehalose, sucrose, lactose, chitobiose, malt sugar, etc. Oligosaccharide includes flucto oligosaccharide, malto oligosaccharide, raffinose, etc. Sugar alchol includes sorbitol, mannitol, etc. Polysaccharide includes dextrin, dextran, etc.

In the first step, at least one selected from a group consisting of monosaccharide, disaccharide, oligosaccharide and sugar alchol and polysaccharide act to remove water content of cells of the vegetable and simultaneously fill both inside and outside of each cell as substances for restricting crystallization of water content. Thus, concentration of the substance outside of the cell becomes substantially equal to that inside of the cell.

In the second step, the vegetables are quickly frozen by such as liquid nitrogen after free water from the vegetables in the first step is removed. In this step, since water content of cells is removed and the inside and outside of the cells are filled with the water crystallization restricting substances, there is no growth of large water crystals, so that breakage of cell membranes cell walls and/or intracell organs of vegetables is prevented. Therefore, vegetables quickly frozen in the second step can be stocked in the freezing environment in the third step without necessity of considering breakage of cell membranes, cell walls and/or intracell organs of vegetables.

Therefore, the frozen fresh vegetables stocked in the freezing environment is not freeze-damaged and the quality thereof is not degraded.

Pickles manufactures can supply to customers light pickles having the same quality as that of conventional light pickles prepared from fresh vegetables by defreezing the frozen vegetables and adding seasoning required by the customers. Further, by supplementing water to the defrozen vegetables to restore plasma of the vegetable cells and to exclude saccharides and/or salts from the vegetables, manufacturers can supply to customers the vegetables as material for green salad.

The freeze-preservation method of vegetables according to the present invention will be described in detail by using embodiments.

PREFERRED EMBODIMENTS OF THE INVENTION

In implementing the present invention, any kind of vegetables can be used and the substances to be added for restricting water crystallization may be any of various combinations of saccharides such as monosaccharide and polysaccharide, sugar alchol and polysaccharide, and monosaccharide, sugar alchol and polysaccharide, each combination being with or without salts. Monosaccharide usable in the present invention includes grape sugar, levulose, xylose, galactose, etc. Disaccharide includes, trehalose, sucrose, lactose, chitobiose, malt sugar, etc. Oligosaccharide includes flucto oligosaccharide, malto oligosaccharide, raffinose, etc. Sugar alcohol includes sorbitol, mannitol, etc. Polysaccharide includes dextrin, dextran, etc.

In the embodiments to be described below, cucumbers which are completely destroyed when frozen were used as vegetables. On the other hand, as the additives to the vegetables, a combination of sugar alcohol and polysaccharide and a combination of sugar alcohol, polysaccharide and salts were used, in which sugar alcohol was sorbitol and polysaccharide was dextrin.

EMBODIMENT 1

First Step

Cucumbers each of 100 g were selected and 5 plastic containers each having a capacity of 50 litters were filled completely with the cucumbers. Sorbitol was added to the 5 plastic containers in ratios of 0 wt %, 5 wt %, 10 wt %, 15 wt % and 20 wt % with respect to total weights of cucumbers in the containers, respectively. In this case, salts and dextrin were not added. Then, cucumbers in the containers were put in a low temperature environment at 10° C. or lower for about 24 to 48 hours.

Second Step

After free water produced in the first step was removed by falling the containers down, cucumbers were derived from the containers, put in a liquid nitrogen continuous freezer and quickly frozen at −100° C. for about 10 to 30 minutes by discharging liquid nitrogen gas into the freezer.

Third Step

Cucumbers quickly frozen in the second step were packed in corrugated cardboard boxes each containing cucumbers of about 10 kg and the corrugated cardboard boxes were put in an airblust freezer and stocked in a freezing environment at −20° C. or lower.

Cucumbers freeze-preserved in the third step were derived after one month, defrozen at room temperature and evaluated in three items, resistance to the teeth, color tint and taste. A result is shown in Table 1 attached. The evaluation of the resistance to, the teeth, the color and the taste were performed as follows:

"Resistance to the teeth (R)" is evaluated by Jelly strength test.

| 3.5 kg or less | ⊙ | (substantially the same as that before processing) |
|---|---|---|
| 3.0–3.5 kg | ○ | (slightly degraded) |
| 2.5–3.0 kg | Δ | (degraded to a sensible extent) |
| 2.5 kg or less | X | (no commercial value) |

"Color (C)" is evaluated by change of color, with color before processing being 0.

| 0–0.5 | ⊙ | (very slight change of color) |
|---|---|---|
| 0.5–1.5 | ○ | (slight change of color) |
| 1.5–3.0 | Δ | (Change of color to a sensible extent) |
| 3.0 or less | X | (no commercial value) |

"Taste (T)" is evaluated by tasting the products by 30 persons.

Similar to that before processing 3 points

Degraded even slightly 2 points

Lower limit of commercial value 1 point

No commercial value 0 point and an average value of points of the tasted products is classified as follows:

| 2.6–3 points | ⊙ |
|---|---|
| 1.8–2.6 points | ○ |
| 1.0–1.8 points | Δ |
| 1.0 or less points | X |

In an item "Total Evaluation (TE)" in the attached Table 1, "Excellent (EX)" indicates a case where all of R, C and T are "⊙", "Good (G)" indicates a case where at least one of R, C and T is "○" while the remaining are "⊙". "Acceptable (A)" indicates a case where at least one of R, C and T is a "Δ" while the remaining are "○" and "Unacceptable (UA)" indicates a case where at least one of R, C and T is "X".

EMBODIMENT 2

Similarly to Embodiment 1 cucumbers each of 100 g were selected and 5 plastic containers each having a capacity of 50 litters were filled completely with the cucumbers. Sorbitol was added to the 5 plastic containers in ratios of 0 wt %, 5 wt %, 10 wt %, 15 wt % and 20 wt % with respect to total weights of cucumbers in the containers, respectively, and dextrin was further added each of the containers at a ratio of 5 wt % with respect to the total weight of cucumbers in the container. In this case, salt was not added. Then, cucumbers in the containers were put in a low temperature environment at 10° C. or lower for about 24 to 48 hours. Thereafter, the cucumbers were preserved through the second and third steps of the Embodiment 1.

Cucumbers freeze-preserved were derived after one month, defrozen at room temperature and evaluated in three items, resistance to the teeth, color tint and taste. A result is shown in the attached Table 1.

EMBODIMENTS 3 to 5

In the embodiment 2, the amount of dextrin was changed to 10 wt %, 15 wt % and 20 wt %, respectively Results are shown in the attached Table 1.

EMBODIMENTS 6 to 10

In the first steps of the Embodiments 1 to 5, salts of 5 wt % were further added to the containers and cucumbers were processed similarly to those in these embodiments, respectively Results are shown in Table 2 attached.

EMBODIMENTS 11 to 15

In the first steps of the Embodiments 1 to 5, salts of 10 wt % were further added to the containers and cucumbers were processed similarly to those in these embodiments, respectively. Results are shown in Table 3 attached.

EMBODIMENTS 16 to 20

In the first steps of the Embodiments 1 to 5, salts of 15 wt % were further added to the containers and cucumbers were processed similarly to those in these embodiments, respectively. Results are shown in Table 4 attached.

EMBODIMENTS 21 to 25

In the first steps of the Embodiments 1 to 5, salts of 20 wt % were further added to the containers and cucumbers were processed similarly to those in these embodiments, respectively Results are shown in Table 5 attached.

In the described embodiments, inside and outside of cells of cucumbers whose total evaluation was "EX" were observed and it has been found that sorbitol permeates into cells and dextrin adheres to an outer surface of cell wall and that there is no water crystal observed. This may be due to that polysaccharides surround cells to suck water in cells out and protect the whole cells and monosaccharide, disaccharide, oligosaccharide or sugar alcohol, and salts in addition in some case, permeates into cells to prevent cell membrane, cell wall and intracell organs from being destroyed.

Possibility of Industrial Utilization

As described herein before and shown in the attached Tables 1 to 5, according to the present invention, it is possible to prevent cells and intracell organs of vegetables from being destroyed or damaged when frozen and make a long term preservation of vegetables possible by adding at least sugar alcohol and polysaccharide or at least one of monosaccharide, disaccharide, oligosaccharide and sugar alcohol and polysaccharide to vegetables and, therefore, it is possible to stably supply fresh vegetables.

Further, by adding a small amount of salts thereto, it is possible to reduce the amount of monosaccharide, disaccharide, oligosaccharide, sugar alcohol or polysaccharide, which are relatively expensive.

Further, since it is possible to substantially reduce the amount of salts contained in vegetables after defrozen by restricting the amount of salts added to the vegetables before they are frozen, the vegetables can be used as they are immediately after defreezing process, without necessity of removing salts.

TABLE 1

| Sample | Additive (wt %) dextrin | sorbitol | salts | Evaluation Item R | C | T | TE |
|---|---|---|---|---|---|---|---|
| Embodiment 1 |
| 1 | 0 | 0 | 0 | X | X | X | UA |
| 2 | 5 | 0 | 0 | X | X | X | UA |
| 3 | 10 | 0 | 0 | X | X | X | UA |
| 4 | 15 | 0 | 0 | △ | △ | ○ | A |
| 5 | 20 | 0 | 0 | △ | △ | ○ | A |
| Embodiment 2 |
| 6 | 0 | 5 | 0 | X | X | X | UA |
| 7 | 5 | 5 | 0 | △ | △ | ○ | A |
| 8 | 10 | 5 | 0 | △ | △ | ○ | A |
| 9 | 15 | 5 | 0 | ○ | ○ | ○ | G |
| 10 | 20 | 5 | 0 | ○ | ○ | ○ | G |
| Embodiment 3 |
| 11 | 0 | 10 | 0 | X | X | X | UA |
| 12 | 5 | 10 | 0 | △ | △ | ○ | A |
| 13 | 10 | 10 | 0 | △ | △ | ○ | A |
| 14 | 15 | 10 | 0 | ○ | ○ | ○ | G |
| 15 | 20 | 10 | 0 | ○ | ○ | ◉ | G |
| Embodiment 4 |
| 16 | 0 | 15 | 0 | X | X | X | UA |
| 17 | 5 | 15 | 0 | △ | △ | ○ | A |
| 18 | 10 | 15 | 0 | △ | △ | ○ | A |
| 19 | 15 | 15 | 0 | ○ | ○ | ○ | G |
| 20 | 20 | 15 | 0 | ○ | ◉ | ◉ | G |
| Embodiment 5 |
| 21 | 0 | 20 | 0 | X | X | X | UA |
| 22 | 5 | 20 | 0 | △ | △ | ○ | A |
| 23 | 10 | 20 | 0 | ○ | ○ | ○ | G |
| 24 | 15 | 20 | 0 | ○ | ○ | ○ | G |
| 25 | 20 | 20 | 0 | ◉ | ◉ | ◉ | EX |

TABLE 2

| Sample | Additive (wt %) dextrin | sorbitol | salts | Evaluation Item R | C | T | TE |
|---|---|---|---|---|---|---|---|
| Embodiment 6 |
| 26 | 0 | 0 | 5 | X | X | X | UA |
| 27 | 5 | 0 | 5 | X | X | △ | UA |
| 28 | 10 | 0 | 5 | △ | △ | ○ | A |
| 29 | 15 | 0 | 5 | △ | △ | ○ | A |
| 30 | 20 | 0 | 5 | △ | △ | ○ | A |
| Embodiment 7 |
| 31 | 0 | 5 | 5 | X | X | △ | UA |
| 32 | 5 | 5 | 5 | △ | △ | ○ | A |
| 33 | 10 | 5 | 5 | ○ | ○ | ○ | G |
| 34 | 15 | 5 | 5 | ○ | ○ | ◉ | G |
| 35 | 20 | 5 | 5 | ◉ | ◉ | ◉ | EX |
| Embodiment 8 |
| 36 | 0 | 10 | 5 | X | X | △ | UA |
| 37 | 5 | 10 | 5 | △ | △ | ○ | A |
| 38 | 10 | 10 | 5 | ○ | ○ | ○ | G |
| 39 | 15 | 10 | 5 | ◉ | ◉ | ◉ | EX |
| 40 | 20 | 10 | 5 | ◉ | ◉ | ◉ | EX |
| Embodiment 9 |
| 41 | 0 | 15 | 5 | X | X | △ | UA |
| 42 | 5 | 15 | 5 | △ | △ | ○ | A |
| 43 | 10 | 15 | 5 | ○ | ○ | ○ | G |
| 44 | 15 | 15 | 5 | ◉ | ◉ | ◉ | EX |
| 45 | 20 | 15 | 5 | ◉ | ◉ | ◉ | EX |
| Embodiment 10 |
| 46 | 0 | 20 | 5 | X | X | △ | UA |
| 47 | 5 | 20 | 5 | △ | △ | ○ | A |
| 48 | 10 | 20 | 5 | ○ | ○ | ◉ | G |
| 49 | 15 | 20 | 5 | ◉ | ◉ | ◉ | EX |
| 50 | 20 | 20 | 5 | ◉ | ◉ | ◉ | EX |

TABLE 3

| Sample | Additive (wt %) dextrin | sorbitol | salts | Evaluation Item R | C | T | TE |
|---|---|---|---|---|---|---|---|
| Embodiment 11 |
| 51 | 0 | 0 | 10 | X | X | X | UA |
| 52 | 5 | 0 | 10 | X | X | △ | UA |
| 53 | 10 | 0 | 10 | △ | △ | ○ | A |
| 54 | 15 | 0 | 10 | △ | △ | ○ | A |
| 55 | 20 | 0 | 10 | △ | △ | ○ | A |
| Embodiment 12 |
| 56 | 0 | 5 | 10 | X | X | △ | UA |
| 57 | 5 | 5 | 10 | ○ | ○ | ◉ | G |
| 58 | 10 | 5 | 10 | ○ | ○ | ◉ | G |
| 59 | 15 | 5 | 10 | ○ | ○ | ◉ | G |
| 60 | 20 | 5 | 10 | ◉ | ◉ | ◉ | EX |
| Embodiment 13 |
| 61 | 0 | 10 | 10 | X | X | △ | UA |
| 62 | 5 | 10 | 10 | ○ | ○ | ◉ | G |
| 63 | 10 | 10 | 10 | ○ | ○ | ◉ | G |
| 64 | 15 | 10 | 10 | ◉ | ◉ | ◉ | EX |
| 65 | 20 | 10 | 10 | ◉ | ◉ | ◉ | EX |
| Embodiment 14 |
| 66 | 0 | 15 | 10 | X | X | ○ | UA |
| 67 | 5 | 15 | 10 | ○ | ◉ | ◉ | G |
| 68 | 10 | 15 | 10 | ○ | ◉ | ◉ | G |
| 69 | 15 | 15 | 10 | ◉ | ◉ | ◉ | EX |
| 70 | 20 | 15 | 10 | ◉ | ◉ | ◉ | EX |

TABLE 3-continued

| Sample | Additive (wt %) dextrin | sorbitol | salts | Evaluation Item R | C | T | TE |
|---|---|---|---|---|---|---|---|
| Embodiment 15 | | | | | | | |
| 71 | 0 | 20 | 10 | X | X | ○ | UA |
| 72 | 5 | 20 | 10 | ○ | ⊙ | ⊙ | G |
| 73 | 10 | 20 | 10 | ⊙ | ⊙ | ⊙ | EX |
| 74 | 15 | 20 | 10 | ⊙ | ⊙ | ⊙ | EX |
| 75 | 20 | 20 | 10 | ⊙ | ⊙ | ⊙ | EX |

TABLE 4

| Sample | Additive (wt %) dextrin | sorbitol | salts | Evaluation Item R | C | T | TE |
|---|---|---|---|---|---|---|---|
| Embodiment 16 | | | | | | | |
| 76 | 0 | 0 | 15 | X | X | X | UA |
| 77 | 5 | 0 | 15 | X | X | △ | UA |
| 78 | 10 | 0 | 15 | △ | △ | ○ | A |
| 79 | 15 | 0 | 15 | △ | △ | ○ | A |
| 80 | 20 | 0 | 15 | △ | △ | ○ | A |
| Embodiment 17 | | | | | | | |
| 81 | 0 | 5 | 15 | X | X | X | UA |
| 82 | 5 | 5 | 15 | ○ | ○ | ○ | G |
| 83 | 10 | 5 | 15 | ○ | ⊙ | ⊙ | G |
| 84 | 15 | 5 | 15 | ○ | ⊙ | ⊙ | G |
| 85 | 20 | 5 | 15 | ⊙ | ⊙ | ⊙ | EX |
| Embodiment 18 | | | | | | | |
| 86 | 0 | 10 | 15 | △ | △ | ○ | A |
| 87 | 5 | 10 | 15 | ○ | ○ | ⊙ | G |
| 88 | 10 | 10 | 15 | ○ | ⊙ | ⊙ | G |
| 89 | 15 | 10 | 15 | ⊙ | ⊙ | ⊙ | EX |
| 90 | 20 | 10 | 15 | ⊙ | ⊙ | ⊙ | EX |
| Embodiment 19 | | | | | | | |
| 91 | 0 | 15 | 15 | ○ | ○ | ⊙ | G |
| 92 | 5 | 15 | 15 | ○ | ⊙ | ⊙ | G |
| 93 | 10 | 15 | 15 | ⊙ | ⊙ | ⊙ | EX |
| 94 | 15 | 15 | 15 | ⊙ | ⊙ | ⊙ | EX |
| 95 | 20 | 15 | 15 | ⊙ | ⊙ | ⊙ | EX |
| Embodiment 20 | | | | | | | |
| 96 | 0 | 20 | 15 | ○ | ○ | ⊙ | G |
| 97 | 5 | 20 | 15 | ○ | ⊙ | ⊙ | G |
| 98 | 10 | 20 | 15 | ⊙ | ⊙ | ⊙ | EX |
| 99 | 15 | 20 | 15 | ⊙ | ⊙ | ⊙ | EX |
| 100 | 20 | 20 | 15 | ⊙ | ⊙ | ⊙ | EX |

TABLE 5

| Sample | Additive (wt %) dextrin | sorbitol | salts | Evaluation Item R | C | T | TE |
|---|---|---|---|---|---|---|---|
| Embodiment 21 | | | | | | | |
| 101 | 0 | 0 | 20 | X | X | X | UA |
| 102 | 5 | 0 | 20 | △ | △ | △ | A |
| 103 | 10 | 0 | 20 | △ | △ | △ | A |
| 104 | 15 | 0 | 20 | △ | △ | ○ | A |
| 105 | 20 | 0 | 20 | ○ | ○ | ⊙ | G |
| Embodiment 22 | | | | | | | |
| 106 | 0 | 5 | 20 | X | X | X | UA |
| 107 | 5 | 5 | 20 | ○ | ○ | ○ | G |
| 108 | 10 | 5 | 20 | ○ | ○ | ○ | G |
| 109 | 15 | 5 | 20 | ○ | ⊙ | ⊙ | G |
| 110 | 20 | 5 | 20 | ⊙ | ⊙ | ⊙ | EX |
| Embodiment 23 | | | | | | | |
| 111 | 0 | 10 | 20 | ○ | ○ | ⊙ | G |
| 112 | 5 | 10 | 20 | ○ | ○ | ⊙ | G |
| 113 | 10 | 10 | 20 | ○ | ⊙ | ⊙ | G |
| 114 | 15 | 10 | 20 | ⊙ | ⊙ | ⊙ | EX |
| 115 | 20 | 10 | 20 | ⊙ | ⊙ | ⊙ | EX |
| Embodiment 24 | | | | | | | |
| 116 | 0 | 15 | 20 | ○ | ○ | ⊙ | G |
| 117 | 5 | 15 | 20 | ○ | ⊙ | ⊙ | G |
| 118 | 10 | 15 | 20 | ⊙ | ⊙ | ⊙ | EX |
| 119 | 15 | 15 | 20 | ⊙ | ⊙ | ⊙ | EX |
| 120 | 20 | 15 | 20 | ⊙ | ⊙ | ⊙ | EX |
| Embodiment 25 | | | | | | | |
| 121 | 0 | 20 | 20 | ○ | ○ | ⊙ | G |
| 122 | 5 | 20 | 20 | ⊙ | ⊙ | ⊙ | EX |
| 123 | 10 | 20 | 20 | ⊙ | ⊙ | ⊙ | EX |
| 124 | 15 | 20 | 20 | ⊙ | ⊙ | ⊙ | EX |
| 125 | 20 | 20 | 20 | ⊙ | ⊙ | ⊙ | EX |

What is claimed is:

1. A method for freeze-preserving vegetables comprising:

a first step of adding combined substances including polysaccharide and at least one substance selected from the group consisting of monosaccharide, disaccharides oligo-saccharide and sugar alcohol to vegetables to pickle the vegetables for 24 to 48 hours, so that the combined substances coact to remove water from cells of the vegetables and simultaneously fill both inside and outside of each cell with the combined substances in order to restrict crystallization of water content therein, thereby preventing cell damage during freezing thereof, a second step of quickly freezing the vegetables pickled in the first steps and a third step of storing the quickly frozen vegetables in a freezing environment.

2. A method for freeze-preserving vegetables comprising:

a first step of adding combined substances including salts, polysaccharide and at least one substance selected from the group consisting of monosaccharide, disaccharide, oligosaccharide and sugar alcohol to vegetables to pickle the vegetables for 24 to 48 hours, so that the combined substances coact to remove water from cells of the vegetables and simultaneously fill both inside and outside of each cell with the combined substances in order to restrict crystallization of water content therein, thereby preventing cell damage during freezing thereof, a second step of quickly freezing the vegetables pickled in the first step, and a third step of storing the quickly frozen vegeta- bles in a freezing environment.

* * * * *